US011152971B2

(12) United States Patent
Abraham et al.

(10) Patent No.: US 11,152,971 B2
(45) Date of Patent: Oct. 19, 2021

(54) FREQUENCY MODULATED OFDM OVER VARIOUS COMMUNICATION MEDIA

(76) Inventors: Charles Abraham, Clarksville, MD (US); Hongbo Yan, North Bethesda, MD (US); James Fisch, Columbia, MD (US); John Jarels, Laurel, MD (US); Alexander M. Sutton, San Francisco, CA (US)

( * ) Notice: Subject to any disclaimer, the term of this patent is extended or adjusted under 35 U.S.C. 154(b) by 242 days.

(21) Appl. No.: 10/770,342

(22) Filed: Feb. 2, 2004

(65) Prior Publication Data
US 2005/0169401 A1    Aug. 4, 2005

(51) Int. Cl.
*H04B 3/54* (2006.01)
*H04L 27/26* (2006.01)
*H04L 1/00* (2006.01)

(52) U.S. Cl.
CPC ............ *H04B 3/54* (2013.01); *H04L 1/0003* (2013.01); *H04L 1/0009* (2013.01); *H04L 27/2627* (2013.01); *H04L 27/2649* (2013.01); *H04B 2203/545* (2013.01); *H04B 2203/5416* (2013.01); *H04B 2203/5445* (2013.01)

(58) Field of Classification Search
CPC . H04L 5/0007; H04L 27/2602; H04L 5/0023; H04L 27/04; H04L 27/2601; H04L 1/06; H04L 1/0618; H04L 1/0625; H04L 2025/0342; H04L 23/02; H04L 27/00; H04L 27/06; H04L 27/2649; H04L 27/36; H04L 27/361; H04L 5/0005; H04B 7/0452; H04B 7/0413; H04B 7/06; H04B 10/60; H04B 1/16; H04B 1/40; H04B 7/0891; H04B 7/12; H04J 11/003; H04J 13/004; H04J 1/00; H04J 2011/0009; H04J 4/00

USPC ........ 375/329, 299, 144, 260, 148; 370/235, 370/319, 343, 344, 347, 378, 483; 307/104; 455/42.43, 23, 17, 205, 207
See application file for complete search history.

(56) References Cited

U.S. PATENT DOCUMENTS

| 4,425,585 A | * | 1/1984 | Sekimoto et al. ............ 386/269 |
| 4,968,970 A | * | 11/1990 | LaPorte ........................ 375/133 |
| 5,351,272 A | | 9/1994 | Abraham |
| 5,521,942 A | * | 5/1996 | Betts et al. ................... 375/295 |

(Continued)

FOREIGN PATENT DOCUMENTS

| EP | 0673131 A2 | 9/1995 |
| EP | 1133092 A1 | 9/2001 |

(Continued)

OTHER PUBLICATIONS

Supplementary Partial European Search Report; European Application No. 05712565.0; Applicant: Satius, Inc.; dated Mar. 15, 2007.

*Primary Examiner* — Linda Wong
(74) *Attorney, Agent, or Firm* — Dale Jensen, PLC; Dale Jensen (57) ABSTRACT

The present invention provides an FM Orthogonal Frequency Division Multiplexing (OFDM) modulation process that enable high-speed data communications over any transmission media and networks. The process is implemented with a modem device modulator and demodulator that provides communication with several other modem devices along any communication media that uses an FM OFDM modulation technique, a physical transmission medium such as power lines, or wireless (air), or cable, or twisted pairs communication media.

24 Claims, 9 Drawing Sheets

(56) References Cited

U.S. PATENT DOCUMENTS

| | | | | |
|---|---|---|---|---|
| 5,521,943 | A * | 5/1996 | Dambacher | 375/295 |
| 5,537,398 | A | 7/1996 | Siwiak | |
| 5,559,377 | A * | 9/1996 | Abraham | 307/104 |
| 5,592,482 | A | 1/1997 | Abraham | |
| 5,625,863 | A | 4/1997 | Abraham | |
| 5,678,182 | A * | 10/1997 | Miller | H04W 88/02 |
| | | | | 342/463 |
| 5,732,113 | A * | 3/1998 | Schmidl et al. | 375/355 |
| 5,818,127 | A | 10/1998 | Abraham | |
| 5,886,619 | A | 3/1999 | Takasan et al. | |
| 5,945,885 | A * | 8/1999 | Schwartz et al. | 332/100 |
| 6,014,386 | A | 1/2000 | Abraham | |
| 6,104,707 | A | 8/2000 | Abraham | |
| 6,144,292 | A | 11/2000 | Brown | |
| 6,255,906 | B1 * | 7/2001 | Eidson | H03F 1/0277 |
| | | | | 330/124 R |
| 6,256,290 | B1 * | 7/2001 | Ramesh | 370/204 |
| 6,298,035 | B1 * | 10/2001 | Heiskala | H04L 25/0204 |
| | | | | 370/206 |
| 6,373,883 | B1 * | 4/2002 | Soerensen et al. | 375/216 |
| 6,396,392 | B1 | 5/2002 | Abraham | |
| 6,405,261 | B1 | 6/2002 | Gaucher | |
| 6,407,987 | B1 | 6/2002 | Abraham | |
| 6,417,737 | B1 * | 7/2002 | Moloudi et al. | 330/301 |
| 6,426,708 | B1 | 7/2002 | Trajkovic et al. | |
| 6,430,148 | B1 | 8/2002 | Ring | |
| 6,522,626 | B1 | 2/2003 | Greenwood | |
| 6,609,039 | B1 * | 8/2003 | Schoen | 700/94 |
| 6,686,832 | B2 | 2/2004 | Abraham | |
| 6,709,172 | B2 | 3/2004 | Brown | |
| 6,744,839 | B1 * | 6/2004 | Tada et al. | 375/376 |
| 6,859,503 | B2 * | 2/2005 | Pautler et al. | 375/299 |
| 7,026,954 | B2 | 4/2006 | Slemmer et al. | |
| 7,072,390 | B1 * | 7/2006 | Sorrells et al. | 375/222 |
| 7,158,475 | B1 * | 1/2007 | Ikeda | H04L 27/2626 |
| | | | | 370/208 |
| 7,227,903 | B2 * | 6/2007 | Nakache et al. | 375/260 |
| 7,324,434 | B2 | 1/2008 | Sawahashi et al. | |
| 7,515,896 | B1 * | 4/2009 | Sorrells | H03D 7/00 |
| | | | | 375/343 |
| 2002/0010870 | A1 | 1/2002 | Gardner | |
| 2002/0131389 | A1 * | 9/2002 | Boesch et al. | 370/342 |
| 2003/0003880 | A1 * | 1/2003 | Ling | H04B 7/0417 |
| | | | | 455/92 |
| 2003/0011861 | A1 * | 1/2003 | Casagrande | H03C 1/547 |
| | | | | 455/313 |
| 2003/0022639 | A1 * | 1/2003 | Hongo | H03G 11/04 |
| | | | | 455/116 |
| 2003/0039317 | A1 | 2/2003 | Taylor et al. | |
| 2003/0081705 | A1 * | 5/2003 | Miller | 375/346 |
| 2003/0086371 | A1 * | 5/2003 | Walton et al. | 370/235 |
| 2003/0095612 | A1 * | 5/2003 | Glas et al. | 375/329 |
| 2003/0125040 | A1 * | 7/2003 | Walton | H04B 7/0417 |
| | | | | 455/454 |
| 2003/0218549 | A1 | 11/2003 | Logvinov et al. | |
| 2004/0017794 | A1 * | 1/2004 | Trachewsky | H04W 48/20 |
| | | | | 370/338 |
| 2004/0042387 | A1 * | 3/2004 | Geile | 370/206 |
| 2004/0052315 | A1 * | 3/2004 | Thielecke et al. | 375/299 |
| 2004/0114560 | A1 | 6/2004 | Jacobsen | |
| 2004/0131125 | A1 * | 7/2004 | Sanderford, Jr. | H04L 5/06 |
| | | | | 375/261 |
| 2004/0141548 | A1 * | 7/2004 | Shattil | 375/146 |
| 2004/0151067 | A1 * | 8/2004 | Szajnowski | G01S 13/52 |
| | | | | 367/90 |
| 2004/0178944 | A1 * | 9/2004 | Richardson et al. | 342/43 |
| 2004/0212481 | A1 | 10/2004 | Abraham | |
| 2004/0223553 | A1 * | 11/2004 | Kumar | 375/259 |
| 2004/0233284 | A1 | 11/2004 | Lesesky et al. | |
| 2004/0258404 | A1 | 12/2004 | Brown | |
| 2004/0264683 | A1 * | 12/2004 | Bye | H04M 7/006 |
| | | | | 379/402 |
| 2005/0001694 | A1 | 1/2005 | Berkman | |
| 2005/0020217 | A1 * | 1/2005 | Khoini-Poorfard | 455/115.1 |
| 2005/0031047 | A1 * | 2/2005 | Maltsev et al. | 375/260 |
| 2005/0089061 | A1 * | 4/2005 | Logvinov et al. | 370/463 |
| 2005/0152463 | A1 * | 7/2005 | DeChamps et al. | 375/260 |
| 2005/0159177 | A1 * | 7/2005 | Trachewsky | H04W 52/24 |
| | | | | 455/522 |
| 2005/0169363 | A1 * | 8/2005 | Logvinov et al. | 375/240 |
| 2005/0232624 | A1 | 10/2005 | Baldwin | |
| 2006/0017324 | A1 | 1/2006 | Pace et al. | |
| 2007/0142078 | A1 | 6/2007 | Chen et al. | |
| 2008/0095121 | A1 * | 4/2008 | Shattil | 370/335 |
| 2008/0158001 | A1 | 7/2008 | McCarty et al. | |
| 2010/0045447 | A1 | 2/2010 | Mollenkopf et al. | |

FOREIGN PATENT DOCUMENTS

| | | |
|---|---|---|
| EP | 1339197 A1 | 8/2003 |
| EP | 1351408 A1 | 10/2003 |
| EP | 1395012 A1 | 3/2004 |
| JP | 09-270765 A | 10/1997 |
| WO | 0251089 A2 | 6/2002 |
| WO | WO03065597 A2 | 8/2003 |

* cited by examiner

FREQUENCY MODULATED OFDM OVER VARIOUS COMMUNICATION MEDIA

BACKGROUND OF THE INVENTION

The present invention relates generally to telecommunication devices, and more particularly to a modulation technique used for enabling and transmitting various media types and digital data at very high speeds over various communication media.

Typically, a telecommunication modem is composed of two components. The first component is the modulator, which typically modulates digital data and provides that modulated data to the transmitter. The second component is the demodulator that demodulates the modulated data back to digital data.

OFDM (Orthogonal Frequency Division Multiplexing) or FDM (Frequency Division Multiplexing) is used in the telecommunication industry. Although it can be combined with adaptive coding and modulation techniques, such as flexible selection among different codes and coding rate, 64 QAM, 32 QAM, 16 QAM, QPSK and BPSK constellations, to approach channel capacity, certain Signal to Noise Ratio (SNR) is required for each coding and modulation combination to achieve a desired Bit Error Rate (BER) performance. Even higher SNRs are needed if the system adopts larger alphabet size for higher data rate. Also, adaptive coding can be used with OFDM based on SNR variations. For example, when the signal is heavily attenuated through the channel, the same data can be repeated several times to boost the SNR at the receiver end for a reliable recovery. However, this would reduce the throughput of the communication system.

In order to achieve desired SNRs for reliable communication and keep the throughput high, the present invention intends to Frequency Modulate (FM) the OFDM data stream before transmission and FM demodulate the RF data stream before demodulating the OFDM data stream.

FM OFDM can gain 10-20 dB SNR that will result in significantly longer distance communication without increasing the transmit power level and significantly higher throughput to keep the high speed for the communication media. These communication media include but are not limited to AC and DC power line carrier communication, wireless communication, cable, telephone lines, twisted pairs, and coaxial cable communications. DC power line communications includes the communication over the DC wiring harness for moving vehicles like trucks, buses, SUV's and etc.

SUMMARY OF THE INVENTION

Briefly stated, in a first embodiment, the present invention defines a new modulation technique that enables high-speed data communications over various transmission media and networks. The FM OFDM modulation technique for communication comprises:
  a modem device that provides communication with several other modem devices along any communication media that uses FM OFDM modulation technique,
  a physical transmission medium, including but not limited to various power lines, or wireless (air), or cable, or twisted pairs communication media.
  a modem device modulator that receives bit streams from video, voice, internet or other digital data sources, and which consists of a FM OFDM modulator that comprises:
  1. receiver feedback information retrieval
  2. coding scheme selection
  3. coding and interleaving
  4. constellation selection among BPSK, QPSK, 16 QAM, etc.
  5. digital modulation
  6. pilot symbol insertion
  7. carrier mapping
  8. IFFT (Inverse Fast Fourier Transfer)
  9. adding cyclic prefix
  10. peak limiting
  11. low pass filtering
  12. ADC (analog to digital converter)
  13. FM (Frequency Modulator) for I and Q
  and a modem device demodulator that sends bit streams to video, voice, internet or other data sources, and which consists of a FM OFDM demodulator that comprises:
  1. decoding and de-interleaving
  2. demodulation (BPSK, QPSK, 16 QAM, etc.)
  3. channel estimation
  4. carrier demapping
  5. FFT (Fast Fourier Transfer)
  6. cyclic prefix removal
  7. frequency offset estimation and compensation
  8. synchronization and timing offset estimation
  9. DAC (digital to analog converter)
  10. FM (Frequency Demodulator)

BRIEF DESCRIPTION OF THE DRAWINGS

The foregoing summary, as well as the following detailed description of the preferred embodiments of the invention, will be better understood when read in conjunctions with the appended drawings. For the purpose of illustrating the invention, there are shown in the drawings embodiments that are presently preferred. It should be understood, however, that the invention is not limited to the precise arrangement and instrumentalities shown. In the drawings, like numerals are used to indicate like elements throughout. In the drawings.

DETAILED DESCRIPTION OF THE INVENTION

The present invention presents improvements to an OFDM or FDM based communication application by FM modulating the OFDM or FDM signals before transmission and FM demodulating the carrier frequencies before OFDM or FDM demodulation.

FM modulation is well known to be used for a number of applications where long distance communications are important. Typically, FM modulation can gain 10-40 dB SNR (signal to noise ratio) depending on the modulation factor that is being used. Bandwidth determines the SNR. Larger bandwidth communication devices have smaller SNR than smaller bandwidth devices. To reach high speed communication, the requirements will be higher bandwidth. If single or a couple of carrier frequencies are being used for communication, then the bandwidth will need to be larger and therefore the SNR will be lower. Even if FM modulation is used for high speed data communication, the SNR will be lower than an OFDM system.

For example, if one needs to reach 10 Mbps speed over a communication media by using a 250 Mhz FM modulated carrier frequency over a 60 Mhz bandwidth, then the level of noise will be about −67 dBm. Even recovering about 15-20 dB SNR by using FM still will not provide reliable long distance communications because the noise level is too high. By using 1024 carriers for OFDM with 30 Mhz bandwidth at a center frequency of 250 Mhz, one can reach up to 150 Mbps speed with a noise level of −86 dBm at every 30 Khz carrier frequency. Consequently OFDM could reach longer distance and higher speed communication than FM although it will depend on the transmitted power too. OFDM will be a better choice for FCC emission consideration.

Block-Wise Description of the OFDM or FDM System from Modulator's Viewpoint 1. feedback from the receiver is retrieved to make a judgment on the forward direction channel quality;
2. the code selection unit picks up a coding scheme based on the previously made channel quality judgment, different codes can be used for higher data rate at the target performance requirement, for example a rate ½ code can be used to replace a rate ⅓ code when the SNR is high;
3. in the coding and interleaving unit, digital streams are encoded with the selected code, either a convolutional or a block code, the output of the encoder is interleaved so that errors due to channel distortion scatter across the stream independently;
4. the constellation selection unit picks up a signal constellation, or alphabet, among BPSK, QPSK, QAM etc. based on the previously made channel quality judgment, different alphabets can be used for higher data rate at the target performance requirement, for example 64-QAM or 16-QAM can be used to replace QPSK or BPSK when the SNR is high;
5. the modulator maps binary output from the coding and interleaving unit to real or complex numbers in the chosen alphabet by the constellation selection unit;
6. pilot symbols are inserted into the symbol stream from the modulator based on a channel estimation algorithm of different kinds;
7. output of the previous unit is then mapped onto specific bins of an Inverse Fast Fourier Transform (IFFT) unit;
8. IFFT unite conducts discrete Fourier transform on the input data;
9. the tailing part of an IFFT output block is prepended to the block in this unit to combat the distortion due to multipath propagation, the prepended part is called Cyclic Prefix (CP);
10. a limitor is used to make sure the signal is within the amplifier's dynamic range;
11. an optional digital low pass filter is used to confine the signal within the desired band, this functionality can also be achieved with an analog low pass filter.
12. the in-phase (I) and quadrature (Q) signal components are then fed to two separate Digital to Analog Converters (DACs). The analog outputs of the DACs are amplified, filtered and mixed with the local oscillator (LO) signal.
13. the mixer output is then sequentially filtered, amplified and fed to a coupler or antenna.
14. the coupler or antenna injects carrier frequency signals into physical media.

Block-wise Description of the OFDM or FDM System from Demodulator's Viewpoint

In the analog part, the carrier frequency signals retrieved from physical transmission media by means of a coupler is amplified, filtered and mixed to generate the intermediate frequency (IF) signal, the IF signal is further amplified, filtered and mixed to generate the baseband signal. This baseband signal is again amplified and filtered. The I and Q components of the filter output are fed into two separate Analog to Digital Converters (ADCs). The digitized I/Q components then propagate through the following blocks:

1. The digital I/Q signals first go through a unit that finds the start and end of a data frame;
2. The second unit estimates and compensates for frequency offset, i.e., the difference between transmit LO frequency and receive LO frequency embedded in the IQ samples;
3. The third unit removes the cyclic prefix of each IFFT block;
4. The fourth unit conducts Fast Fourier Transform (FFT) on each IFFT block after CP is removed;
5. Carrier demapper separates the pilot and information bearing bins in the output of FFT unit;
6. The channel estimation unit generates estimates of noise power and channel gain at each FFT bin;
7. With the help of channel gain and noise power estimates, the demodulator generates hard or soft decisions on the modulating bits;

8. The de-interleaver permutes the hard or soft decisions and then feeds its output to a decoder which generates bit streams to be delivered to the upper layer applications such as internet, video/audio/telephone/data.

Figure 1:
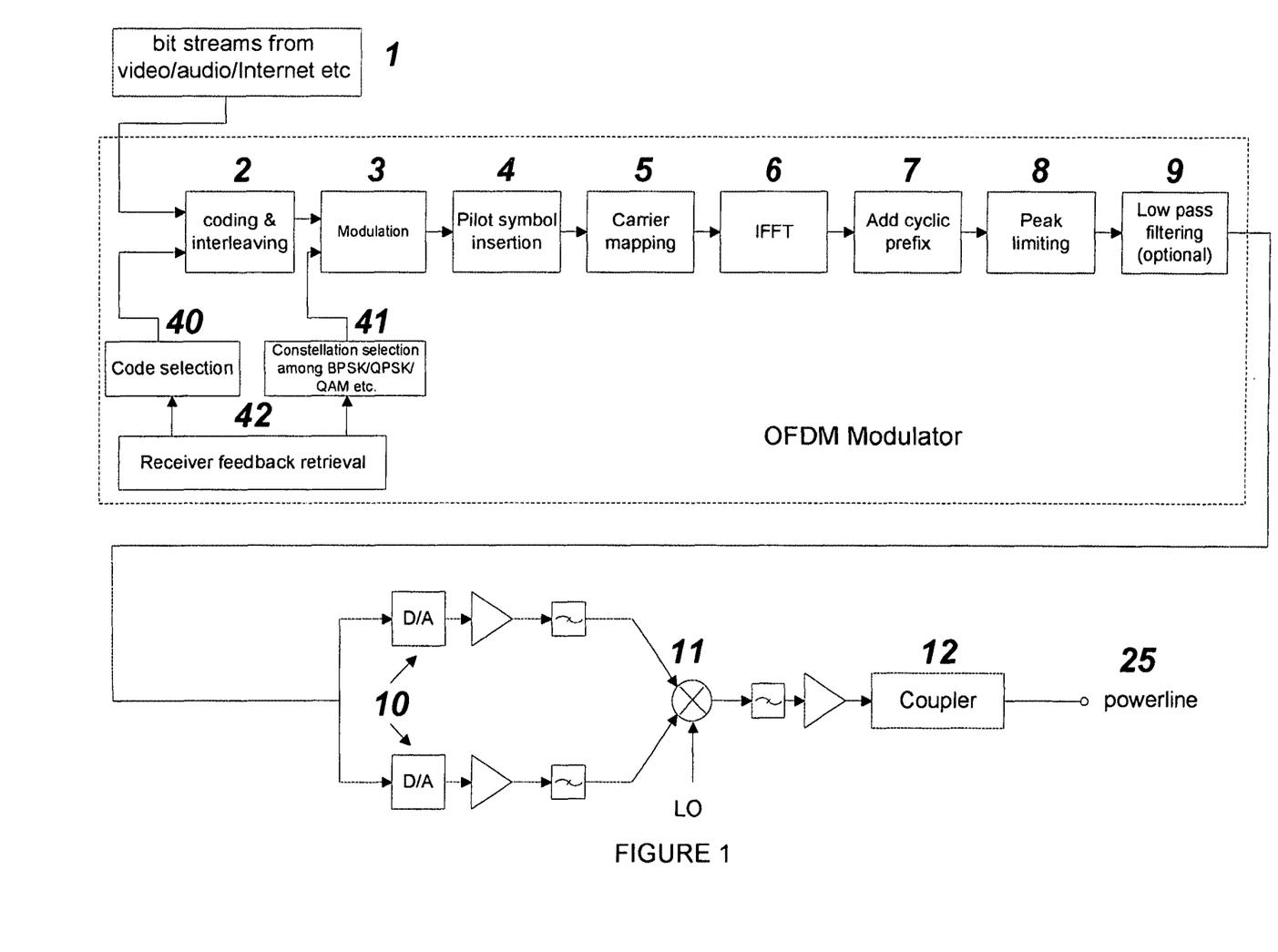
FIG. 1 is a graphical illustration of the OFDM (Orthogonal Frequency Division Multiplexing) transmitter (modulator) for power line carrier (PLC) communication that includes a power line coupler, RF and analog circuitry, in accordance with one preferred embodiment of the present invention.

FIG. 1 shows the transmitter, coupler and Orthogonal Frequency Division Multiplexing (OFDM) Modulator, which is a multi-carrier modulation scheme by means of Fast Fourier Transform (FFT). This modulation scheme takes as input bit streams 1 from any application, such as voice/video/audio/internet. It retrieves forward channel quality feedback from the receiver 42 and selects a good code 40, such as a block code or a convolutional code, to encode the bit streams accordingly, then interleaves 2 the encoded bits to break error bursts at the receiver end into scattered individual errors across the whole transmission. The Receiver feedback retrieval 42, the Code Selection 40, the Constellation selection 41, coding & interleaving 2, and modulation 3 accomplishes the adaptive coding and adaptive modulation for the OFDM system. The OFDM system further converts interleaved bits into real or complex symbols in an alphabet 3 which is selected 41 based on channel condition feedback. Different alphabets can be used for a higher data rate at the target performance requirement, for example 64-QAM or 16-QAM can be used to replace QPSK or BPSK when the channel signal to noise ratio is high. After pilot symbols 4 are inserted, the composite symbol stream modulates specific carriers 5 via Inverse Fast Fourier Transform (IET) 6. A tailing part is copied to the beginning of the IFFT results to make the Cyclic Prefix (CP) 7. A limitor 8 is used to make sure the digital signal is within the amplifier's dynamic range. An optional digital low pass filter 9 can also be used to confine the signal within the desired band. This functionality may alternatively be achieved with an analog low pass filter. The in-phase (I) and quadrature (Q) components of the digital signal are now fed to two separate Digital to Analog Converters (DACs) 10. The analog outputs of the DACs are amplified, filtered and mixed 11 with the local oscillator (LO) signal. The mixer output is sequentially filtered, amplified and sent to a coupler or antenna 12, which will transmit the DSP carrier frequency signals to the communication media 25 like power line, air, coax cable, or twisted pair cable.

Figure 2:
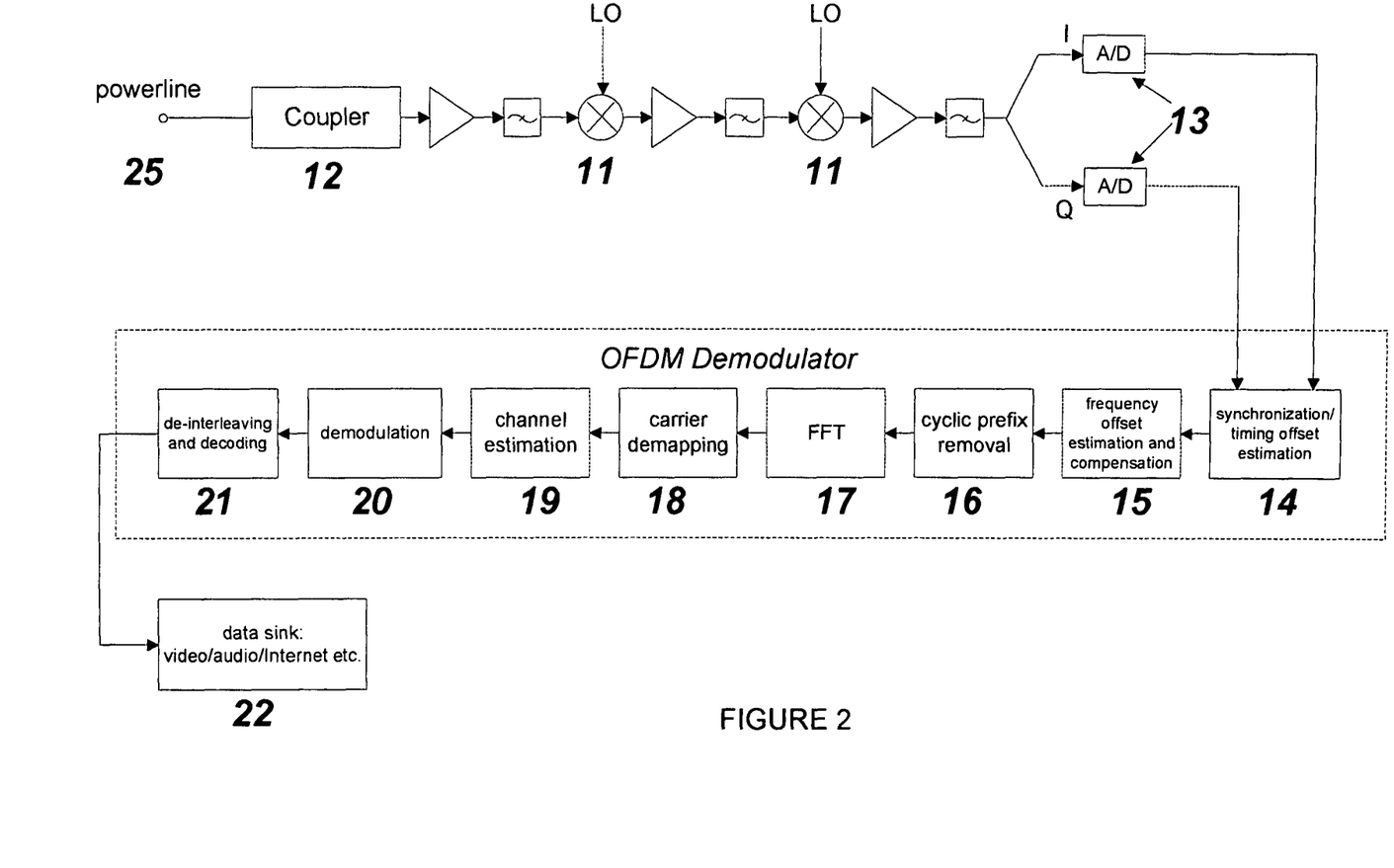
FIG. 2 is a graphical illustration of the OFDM (Orthogonal Frequency Division Multiplexing) receiver (demodulator) for power line carrier communication that includes a power line coupler, RF and analog circuitry, in accordance with one preferred embodiment of the present invention.

FIG. 2 shows the receiver, coupler and Orthogonal Frequency Division Multiplexing (OFDM) Demodulator. In the analog part, the carrier frequency signal retrieved from physical transmission media 25 by means of a coupler or antenna 12 is amplified, filtered and mixed 11 to generate the intermediate frequency (IF) signal, and the IF signal is again amplified, filtered and mixed 11 to generate the base band signal. This base band signal is further amplified and filtered. The I and Q components of the filter output are sent to two separate Analog to Digital Converters (ADCs) 13. From the digitized I/Q components, the frame header is located by means of synchronization algorithms 14. Frequency offset 15 or the difference between transmit LO and receive LO is estimated and compensated. Based on the knowledge of the frame header, the cyclic prefix 16 of each transmitted IFFT block is removed and Fast Fourier Transform (FFT) 17 is conducted. From obtained results on pilot-bearing carriers 18, channel estimation algorithm 19 delivers noise power and channel gain estimates which facilitates the generation of hard or soft decisions on the encoded bits 20. The hard or soft decisions are finally de-interleaved and fed to the decoder 21 that gives bit streams 22 transmitted for upper layer applications such as internet, video/audio/data.

Figure 3:
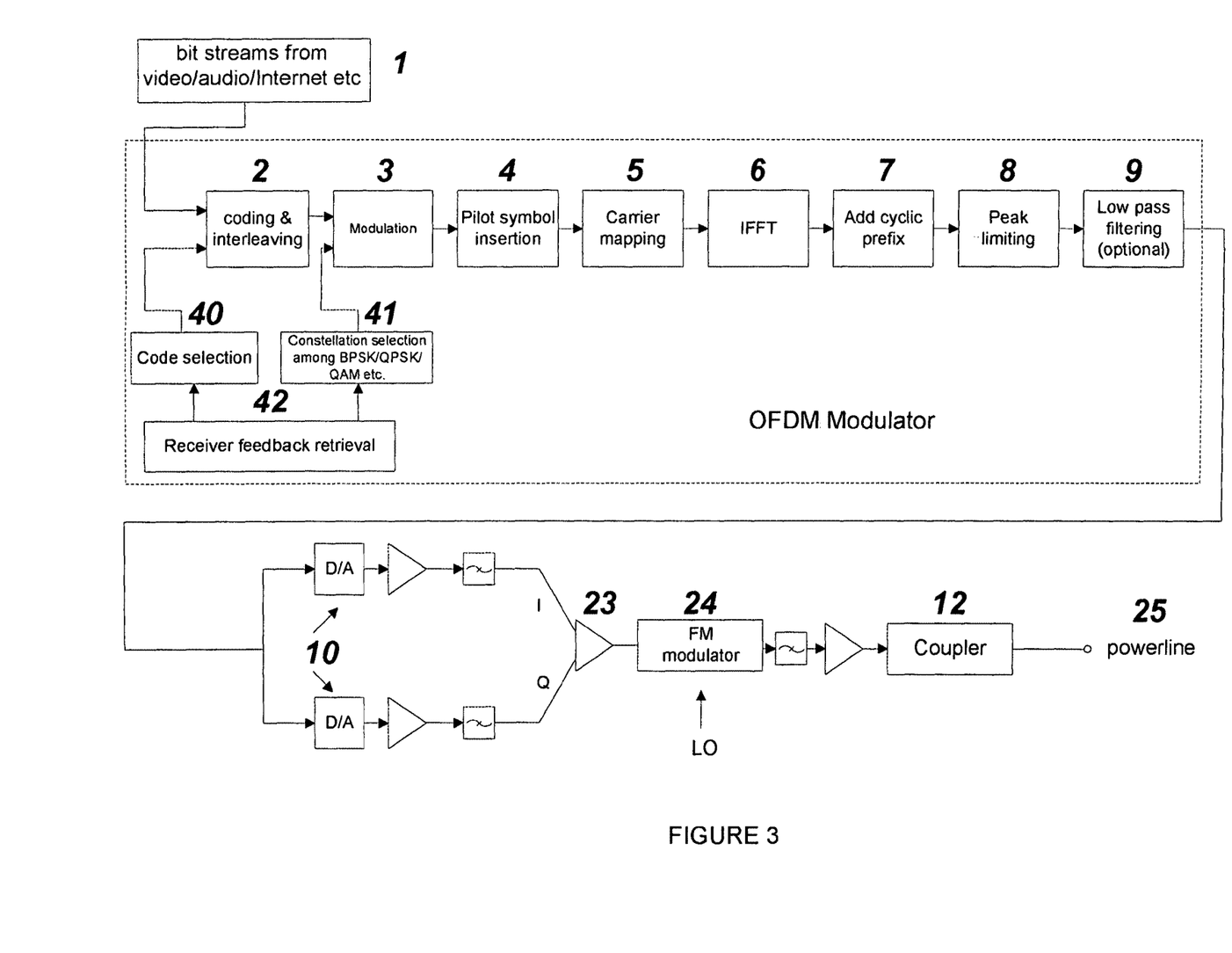
FIG. 3 is one of the graphical illustrations of the FM (Frequency Modulated) OFDM (Orthogonal Frequency Division Multiplexing) transmitter (modulator) for power line communication that includes a power line coupler, RF and analog circuitry, in accordance with one preferred embodiment of the present invention.

FIG. 3 shows the Frequency Modulated (FM) Orthogonal Frequency Division Multiplexing (OFDM) Modulator which is a multi-carrier modulation scheme by means of Fast Fourier Transform (FFT). This modulation scheme takes as input bit streams 1 from any application, such as voice/video/audio/internet. It retrieves forward channel quality feedback from the receiver 42 and selects a good code 40, such as a block code or a convolutional code, to encode the bit streams accordingly, then interleaves 2 the encoded bits to break error bursts at the receiver end into scattered individual errors across the whole transmission. The Receiver feedback retrieval 42, the Code Selection 40, the Constellation selection 41, coding & interleaving 2, and modulation 3 accomplishes the adaptive coding and adaptive modulation for the OFDM system. The OFDM system further converts interleaved bits into real or complex symbols in an alphabet 3 which is selected 41 based on channel condition feedback. Different alphabets can be used for a higher data rate at the target performance requirement, for example 64-QAM or 16-QAM can be used to replace QPSK or BPSK when the channel signal to noise ratio is high. After pilot symbols 4 are inserted, the composite symbol stream modulates specific carriers 5 via Inverse Fast Fourier Transform (IFFT) 6. A tailing part is copied to the beginning of the IFFT results to make the Cyclic Prefix (CP) 7. A limitor 8 is used to make sure the digital signal is within the amplifier's dynamic range. An optional digital low pass filter 9 can also be used to confine the signal within the desired band. This functionality may alternatively be achieved with an analog low pass filter. The in-phase (I) and quadrature (Q) components of the digital signal are now fed to two separate Digital to Analog Converters (DACs) 10. The analog outputs of the DACs are amplified, filtered, I and Q is converted together 23 and FM Modulated 24 with the local oscillator (LO) signal. The FM Modulator 24 output is sequentially filtered, amplified and sent to a coupler or antenna 12, which will transmit the DSP carrier frequency signals to the communication media 25 like power line, air, coax cable, or twisted pair cable.

Figure 3A:
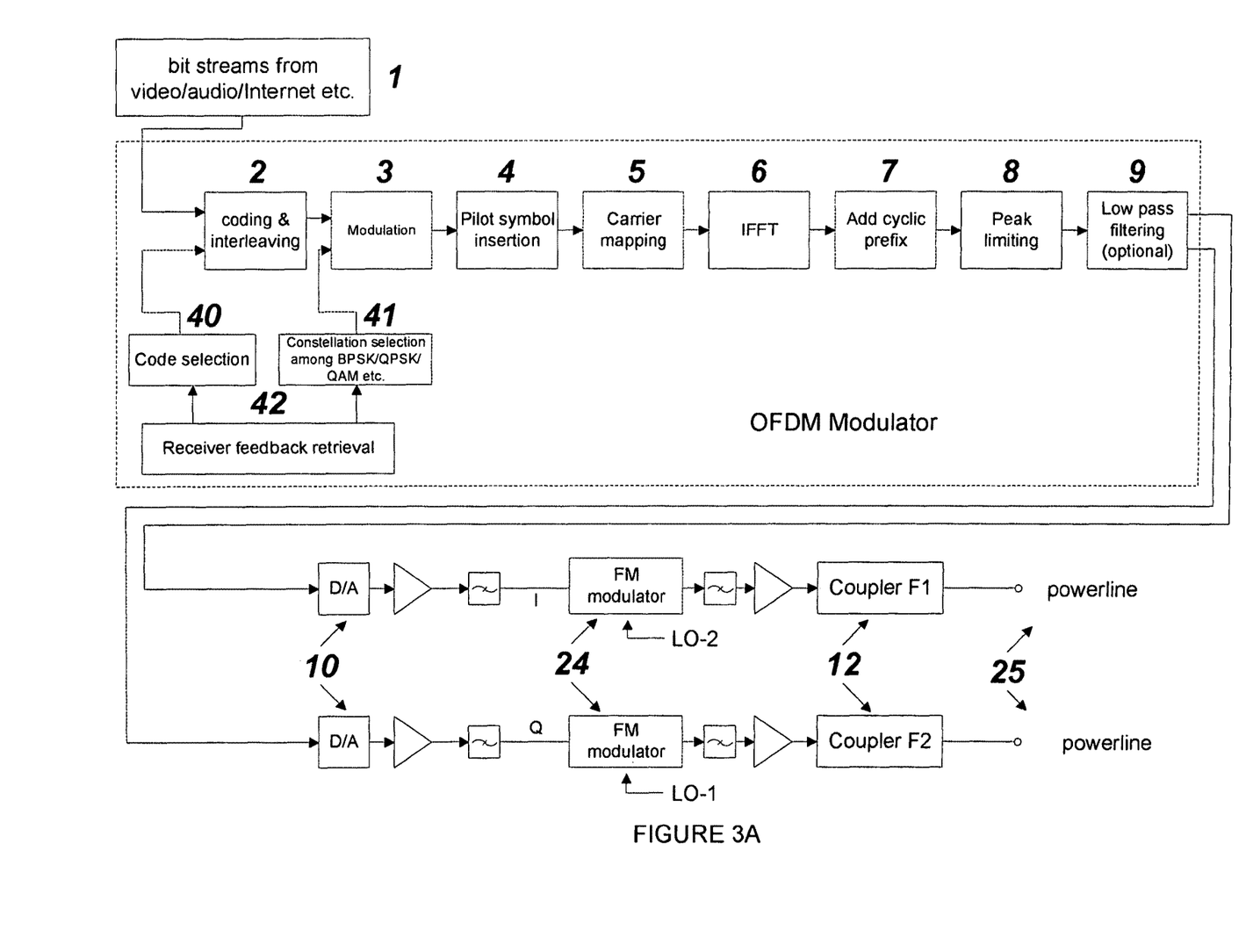
FIG. 3A is another graphical illustration of the FM (Frequency Modulated) OFDM (Orthogonal Frequency Division Multiplexing) transmitter (modulator) for power line communication that includes a power line coupler, RF and analog circuitry, in accordance with one preferred embodiment of the present invention.

FIG. 3A shows another embodiment of the Frequency Modulated (FM) Orthogonal Frequency Division Multiplexing (OFDM) Modulator, when I and Q base band converter 23 is not developed yet, which is a multi-carrier modulation scheme by means of Fast Fourier Transform (FFT). This modulation scheme takes as input bit streams 1 from any application, such as voice/video/audio/internet. It retrieves forward channel quality feedback from the receiver 42 and selects a good code 40, such as a block code or a convolutional code, to encode the bit streams accordingly, then interleaves 2 the encoded bits to break error bursts at the receiver end into scattered individual errors across the whole transmission. The Receiver feedback retrieval 42, the Code Selection 40, the Constellation selection 41, coding & interleaving 2, and modulation 3 accomplishes the adaptive coding and adaptive modulation for the OFDM system. The OFDM system further converts interleaved bits into real or complex symbols in an alphabet 3 which is selected 41 based on channel condition feedback. Different alphabets can be used for a higher data rate at the target performance requirement, for example 64-QAM or 16-QAM can be used to replace QPSK or BPSK when the channel signal to noise ratio is high. After pilot symbols 4 are inserted, the composite symbol stream modulates specific carriers 5 via Inverse Fast Fourier Transform (IFFT) 6. A tailing part is copied to the beginning of the IFFT results to make the Cyclic Prefix (CP) 7. A limitor 8 is used to make sure the digital signal is within the amplifier's dynamic range. An optional digital low pass filter 9 can also be used to confine the signal within the desired band. This functionality may alternatively be achieved with an analog low pass filter. The in-phase (I) and quadrature (Q) components of the digital signal are now fed to two separate Digital to Analog Converters (DACs) 10. The analog outputs of the DACs are amplified, filtered, and I and Q is separately FM Modulated 24 with two different local oscillator (LO) signals. The two FM Modulators 24 output will create 2 separate frequency bands F1 and F2 (for I and Q) for communication which is sequentially filtered, amplified and sent to a coupler F1 and coupler F2 or antenna F1 and antenna F2 12, which will transmit the DSP carrier frequency signals to the communication media 25 like power line, air, coax cable, or twisted pair cable.

Figure 4:
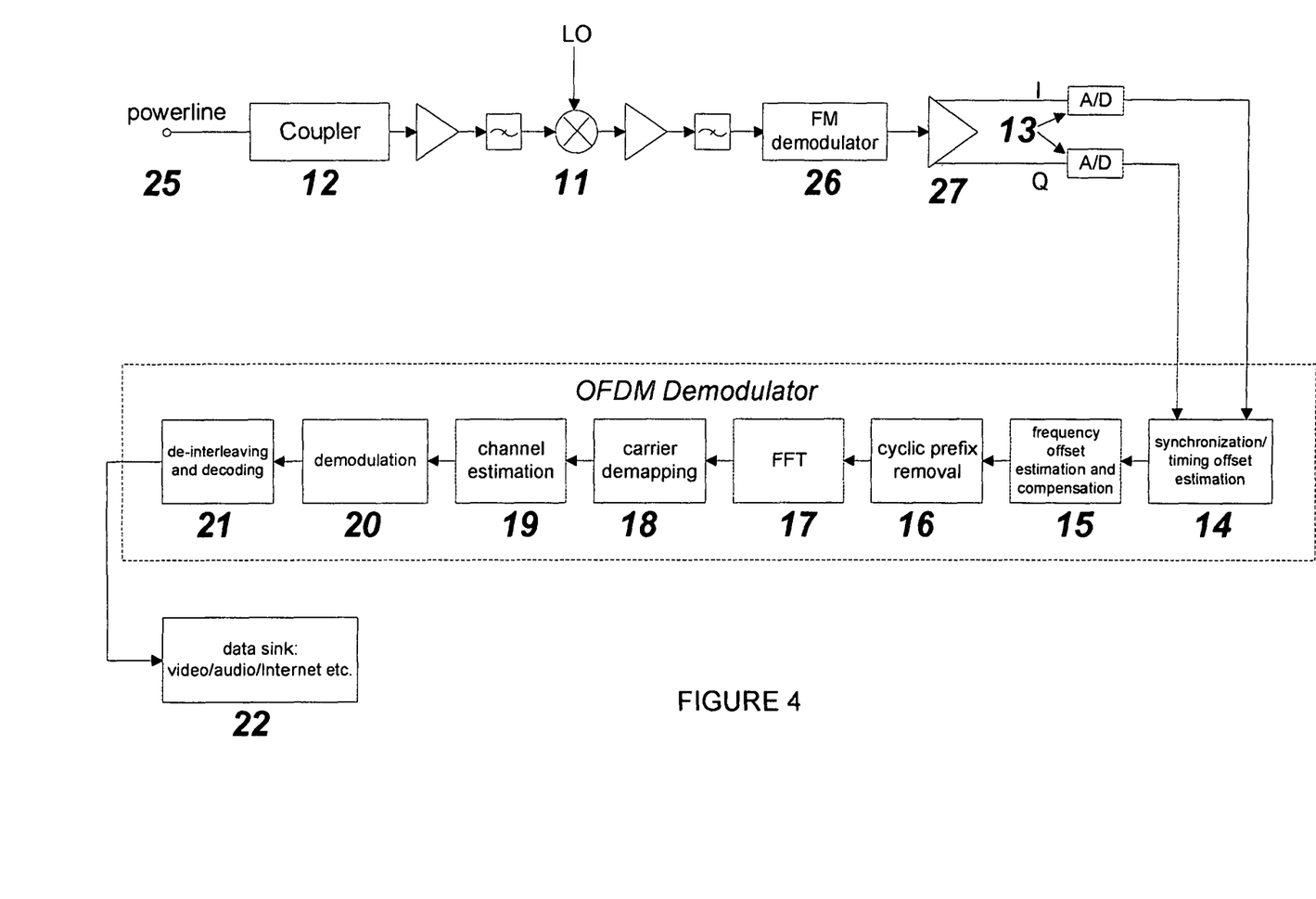
FIG. 4 is one of the graphical illustrations of the FM (Frequency Demodulated) OFDM (Orthogonal Frequency Division Multiplexing) receiver (demodulator) for power line communication that includes a power line coupler, RF and analog circuitry, in accordance with one preferred embodiment of the present invention.

FIG. 4 shows the receiver, coupler, FM demodulator and Orthogonal Frequency Division Multiplexing (OFDM) Demodulator. In the analog part, the carrier frequency signal retrieved from physical transmission media 25 by means of a coupler or antenna 12 is amplified, filtered and mixed 11 to generate the intermediate frequency (IF) signal, and the IF signal is again amplified, filtered and FM Demodulated 26 to generate the base band signal. This base band signal is further converted 27 into I and Q, amplified and filtered. The I and Q components of the filter output are sent to two separate Analog to Digital Converters (ADCs) 13. From the digitized I/Q components, the frame header is located by means of synchronization algorithms 14. Frequency offset 15 or the difference between transmit LO and receive LO is estimated and compensated. Based on the knowledge of the frame header, the cyclic prefix 16 of each transmitted IFFT block is removed and Fast Fourier Transform (FFT) 17 is conducted. From obtained results on pilot-bearing carriers 18, channel estimation algorithm 19 delivers noise power and channel gain estimates which facilitates the generation of hard or soft decisions on the encoded bits 20. The hard or soft decisions are finally de-interleaved and fed to the decoder 21 that gives bit streams 22 transmitted for upper layer applications such as internet, video/audio/data.

Figure 4A:
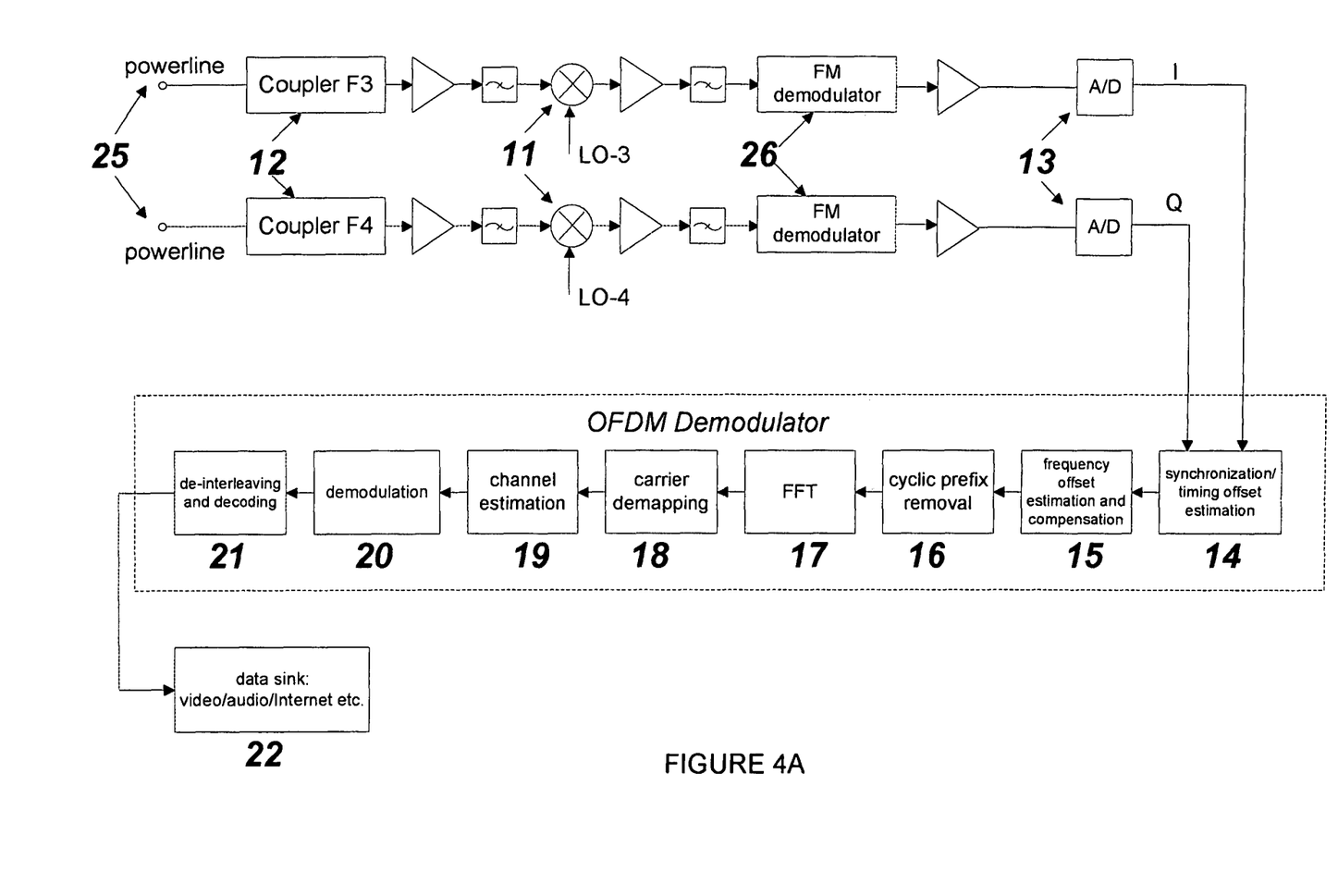
FIG. 4A is another graphical illustration of the FM (Frequency Demodulated) OFDM (Orthogonal Frequency Division Multiplexing) receiver (demodulator) for power line communication that includes a power line coupler, RF and analog circuitry, in accordance with one preferred embodiment of the present invention.

FIG. 4A is another embodiment of the FM OFDM demodulator when the base band converted 27 into I and Q is not developed yet. In this case, I and Q is separately FM demodulated from two different frequency bands like F3 and F4 and sent to the OFDM demodulator for data recovery. In the analog part, the two carrier frequency band signal F3 and F4 is retrieved from physical transmission media 25 by means of a coupler F3 and F4 or antenna F3 and F4 12 is amplified, filtered and mixed 11 to generate the intermediate frequency (IF) signal, and the IF signal is again amplified, filtered and F3 and F4 frequency bands are separately FM Demodulated 26 to generate the base band signal. These base band I and Q signals separately are further amplified and filtered. The I and Q components of the filter output are sent to two separate Analog to Digital Converters (ADCs) 13. From the digitized I/Q components, the frame header is located by means of synchronization algorithms 14. Frequency offset 15 or the difference between transmit LO and receive LO is estimated and compensated. Based on the knowledge of the frame header, the cyclic prefix 16 of each transmitted IFFT block is removed and Fast Fourier Transform (IFFT) 17 is conducted. From obtained results on pilot-bearing carriers 18, channel estimation algorithm 19 delivers noise power and channel gain estimates which facilitates the generation of hard or soft decisions on the encoded bits 20. The hard or soft decisions are finally de-interleaved and fed to the decoder 21 that gives bit streams 22 transmitted for upper layer applications such as internet, video/audio/data.

Figure 5:
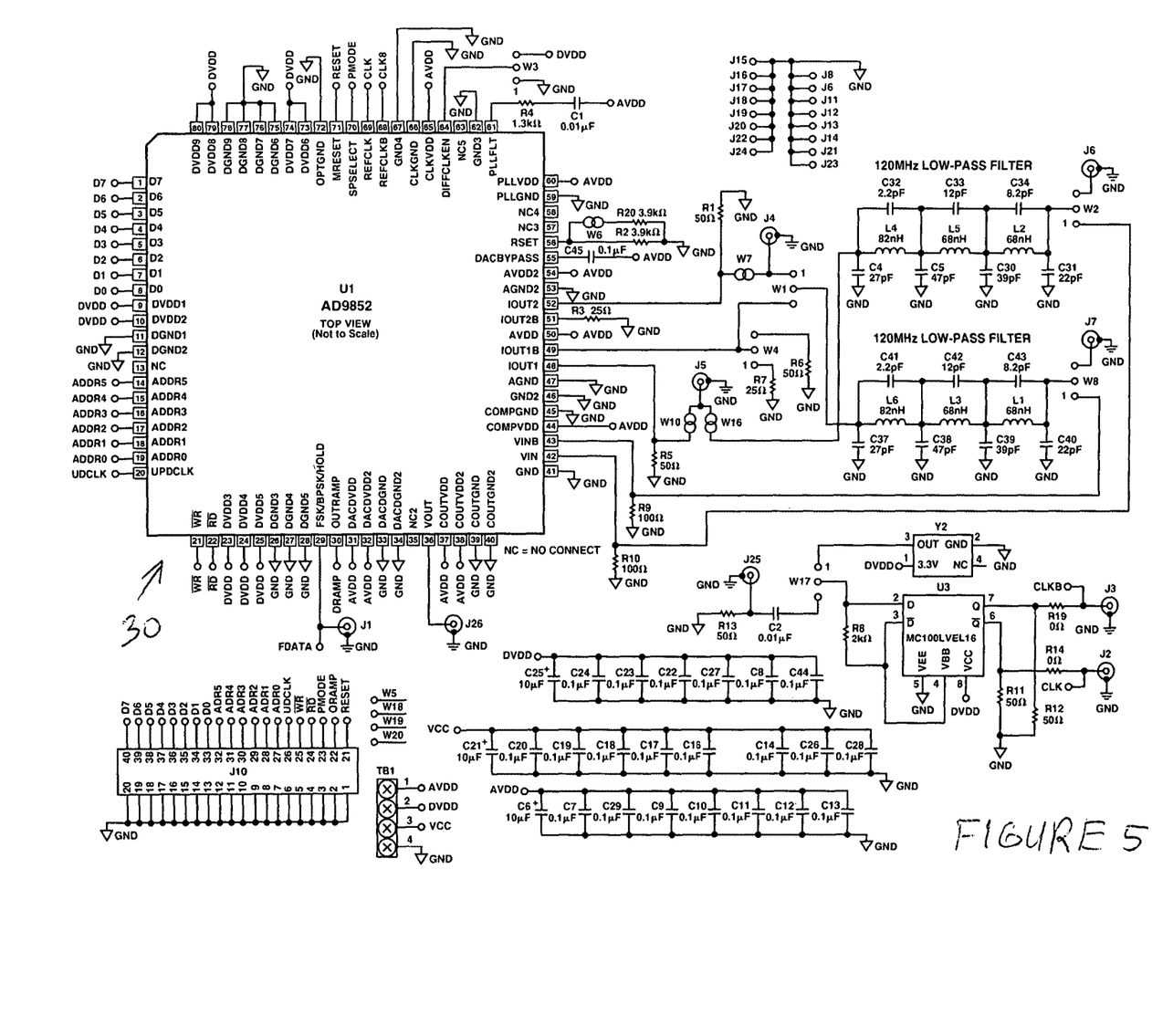
FIG. 5 is one of the graphical illustrations of the FM modulator using Direct Digital Synthesizer (DDS), in accordance with one preferred embodiment of the present invention.

FIG. 5 shows an embodiment of an FM modulator which uses AD9852 Integrated Circuits (IC) from Analog Devices, Inc. This IC is a Direct Digital Synthesizer (DDS) 30 and includes the D/A converters 10 and the FM modulator 24.

Figure 6:
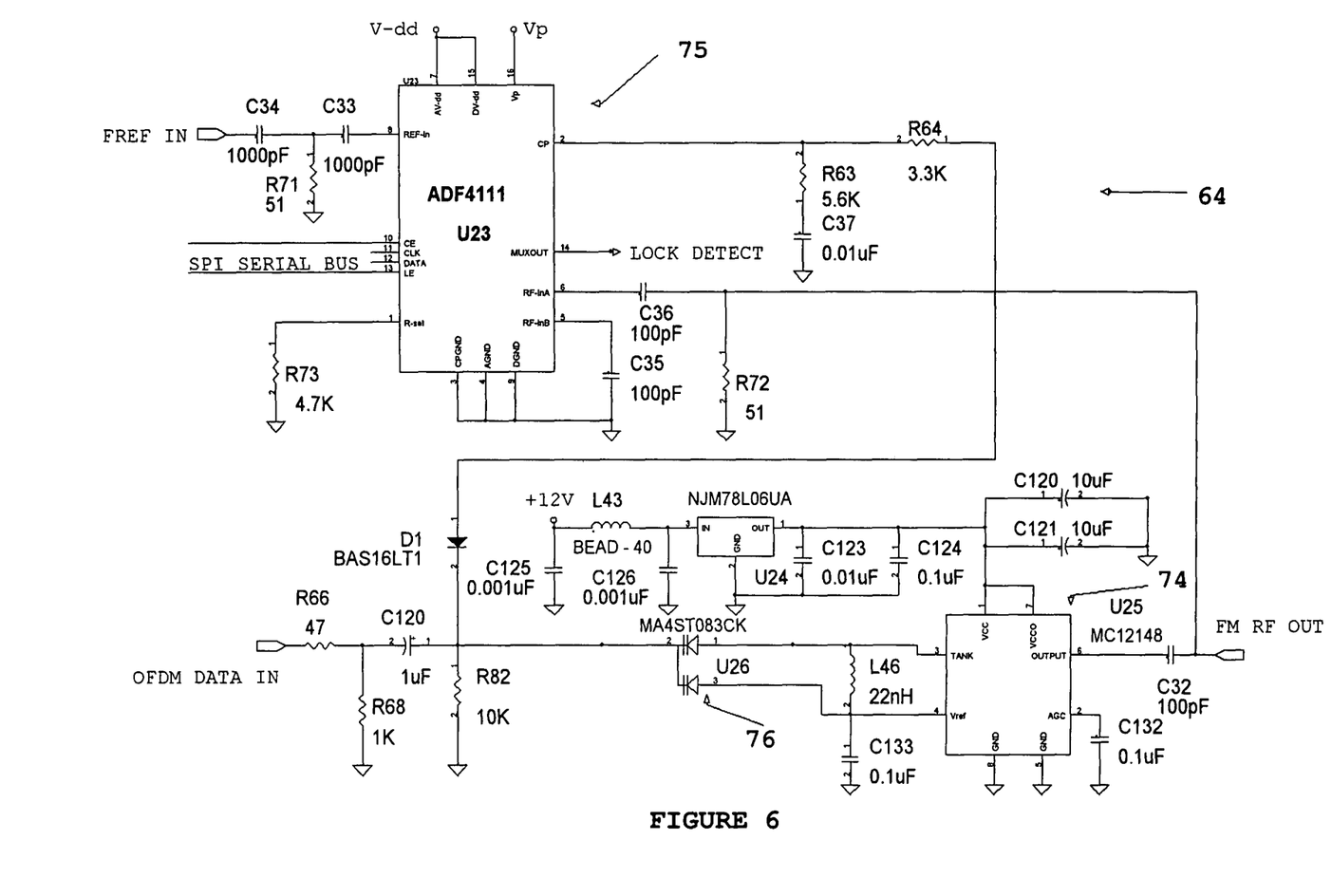
FIG. 6 is another graphical illustration of the FM modulator, in accordance with one preferred embodiment of the present invention.

FIG. 6 shows another embodiment of an FM modulator 64 that uses a Phase Lock Loop (PLL) IC 75 such as the ADF4111 IC, a Voltage controlled oscillator (VCO) 74 such as the MC12148 IC (available from Motorola), and a varactor diode 76 such as the MA4ST083CK (available from M/A-COM, Lowell, Mass.). The varactor 76 oscillates with the L46 inductor to create the oscillation frequency and the FM modulation, while the PLL 75 controls and stabilize the carrier frequency for the VCO 74.

Figure 7:
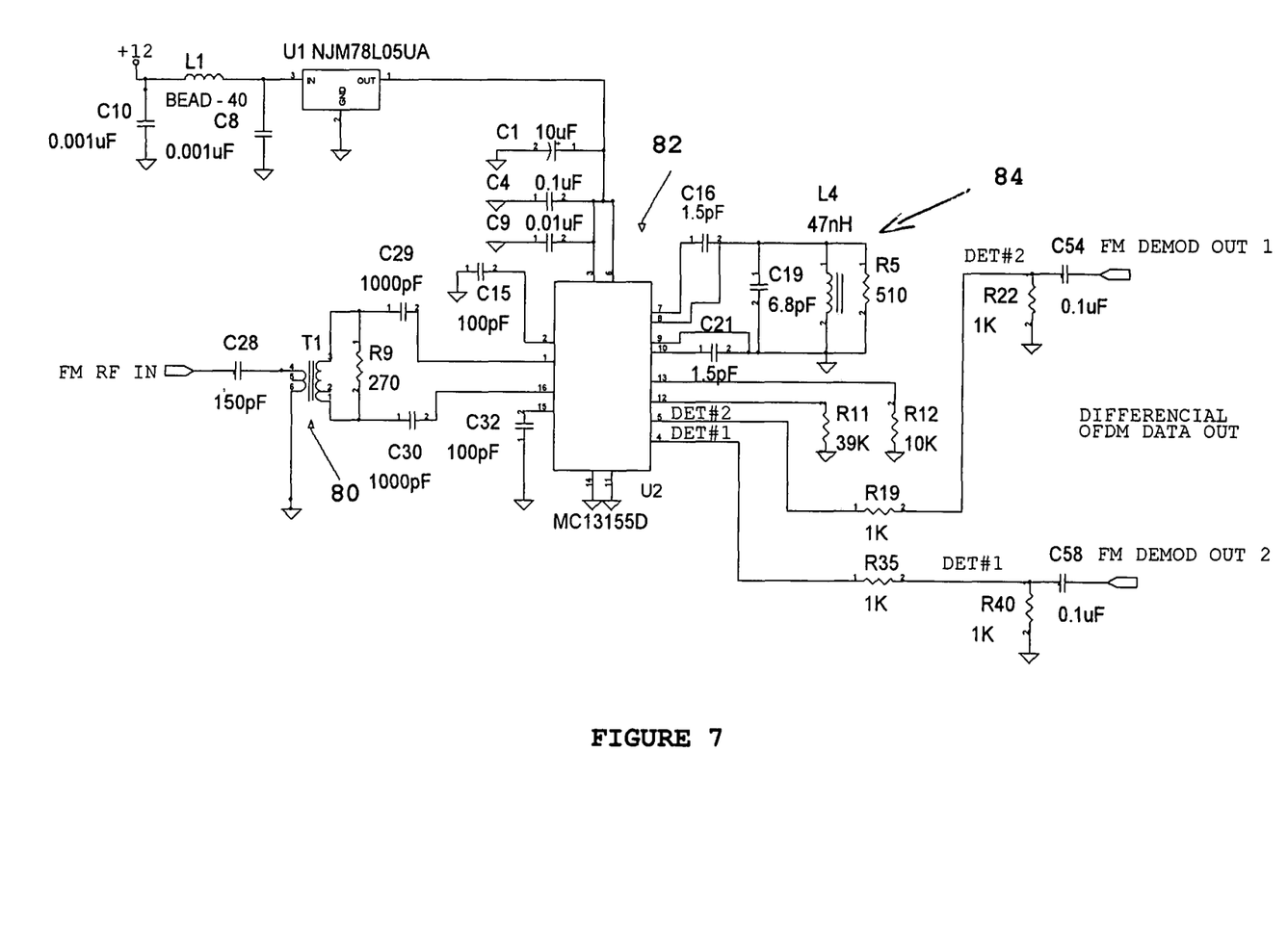
FIG. 7 is a graphical illustration of a typical FM demodulator, in accordance with one preferred embodiment of the present invention.

FIG. 7 shows an embodiment of the FM demodulator 26 where an MC13155D (available from Motorola) wideband FM limiter IC is used with a RLC tank circuit 84 that determines the carrier frequency and its necessary bandwidth for detection.

Another example of an FM demodulation scheme is to use a PLL with VCO and charge pump.

The challenge to do FM OFDM is that OFDM carrier frequencies do not come out as a flat frequency response from the D/A converters. The magnitude variations between each carrier frequency can usually reach 12 dB. Thus, the OFDM processing needs to include more processing power and higher sampling rates in order to get the OFDM carrier frequencies smaller magnitude variations.

For power line communication, any type of coupler can be used. The present invention prefers to use a capacitive coupler or resin/dielectric-filled coupler for overhead or for underground power lines. A coupler is a transformer. Thus, a transformer can be a capacitive transformer to become a capacitive coupler. A resin-filled coupler means that a transformer is filled in resin. A dielectric-filled coupler means that a transformer is filled with a dielectric material. A capacitive transformer can also be filled with resin or other dielectric material. The transformer primary impedance is the same order of magnitude as that of overhead or underground power lines or larger. A capacitive coupler with a data port may be used here to couple a modem to the line. The line, may be terminated with a resistance approximately equal to the characteristic impedance of the power transmission cable. Modem means herein is the modulator and demodulator. The secondary side of a capacitive coupler that connects to the transmitter and/or receiver is wound about equal number of turns as the primary side of the coupler that is connected through a capacitor to the power line. The coupler has a core between the primary and secondary winding. This coupler can be used for any high voltage power line between 120V AC to 750 KV AC with the necessary safety changes. The most preferred coupler for power line communication is the matching coupler that can match the power line characteristic impedance to the coupler and the coupler can also match the characteristic impedance of the transmitter receiver at anytime and any location.

Changes can be made to the embodiments described above without departing from the broad inventive concept thereof. The present invention is thus not limited to the particular embodiments disclosed, but is intended to cover modifications within the spirit and scope of the present invention.

What is claimed is:

1. An apparatus constructed to transmit a communication signal over a transmission medium, said apparatus comprising:

a plurality of digital signal processing units constructed to process an incoming baseband signal and output a frequency division multiplexed (FDM) output signal defining a modulated OFDM system, wherein the baseband signal is a digitally modulated with a digital modulation technique adaptively selected based on a retrieved transmission medium quality feedback;

at least one digital to analog converter (DAC) operable to convert said FDM output signal to at least one analog FDM signal; and a first frequency modulation (FM) modulator coupled to said at least one DAC, said first FM modulator disposed in serial relation with said modulated OFDM system, said first FM modulator receiving said analog FDM signal of said DAC and outputting a frequency modulated (FM)-FDM signal to the transmission medium, said frequency modulated FM-OFDM signal undergoing FM modulation.

2. The apparatus of claim 1, further including a second FM modulator, said second FM modulator being disposed in parallel relation to said first FM modulator wherein the FDM output signal of the digital signal processing units includes an in-phase signal and a quadrature signal, the in-phase signal being provided to the first FM modulator and the quadrature signal being provided to the second FM modulator, the first and the second FM modulators each outputting a frequency modulated FM-OFDM output signal to the transmission medium.

3. An apparatus for receiving a communication signal from a transmission medium, said apparatus comprising:
a plurality of digital signal processing units being adapted to process a frequency division multiplexing (FDM) communication signal and output a baseband signal defining demodulated OFDM system;
at least one analog one digital converter (ADC) operatively coupled to said demodulated OFDM system; and
a first frequency modulation (FM) demodulator disposed in serial relation to said demodulated OFDM system, said first FM demodulator receiving an analog frequency modulated (FM)-FDM communication signal from a transmission medium coupled thereto and demodulating said FM-FDM signal to output an analog FDM communication signal to said ADC, said analog FDM signal demodulated to have an instantaneous amplitude response to an instantaneous frequency of said FM-FDM communication signal, said FM-FDM communication signal undergoing FM demodulation;
said demodulated OFDM system being operatively coupled to an output of the first FM demodulator via said ADC, said demodulated OFDM system digitally demodulating said FDM signal with a digital modulation technique adaptively selected based on a retrieved transmission medium quality feedback.

4. The apparatus of claim 3, wherein an output of the transmission medium includes an in-phase signal and a quadrature signal, the in-phase signal being provided to the first FM demodulator and the quadrature signal being provided to a second FM demodulator, said second FM demodulator being disposed in parallel relation to said first FM demodulator and the first and the second FM demodulators each outputting a frequency demodulated FDM signal to the demodulated OFDM system.

5. An apparatus for transmitting a communication signal over a transmission medium, said apparatus comprising:
a plurality of digital signal processing units adapted to process an incoming baseband signal and output a frequency division multiplex (FDM) output signal defining a modulated OFDM system, wherein the baseband signal is digitally modulated with a digital modulation technique adaptively selected based on a retrieved transmission medium quality feedback;
at least one digital to analog converter (DAC) coupled to said modulated OFDM system and operable to convert said FDM output signal to at least one analog FDM signal; and
a first frequency modulation (FM) modulator disposed in serial relation to said modulated OFDM system and coupled to said at least one DAC, said first FM modulator receiving said analog FDM signal of said DAC and outputting a frequency modulated (FM)-FDM signal to the transmission medium, wherein said FM-FDM signal undergoes FM modulation.

6. The apparatus of claim 5, further including a second FM modulator wherein said analog FDM signal of said DAC includes an in-phase signal and a quadrature signal, the in-phase signal being provided to the first FM modulator and the quadrature signal being provided to the second FM modulator, the first and the second FM modulators each outputting a frequency modulated FM-FDM output signal to the transmission medium.

7. An apparatus for receiving a communication signal from a transmission medium, said apparatus comprising:
a plurality of digital signal processing units being adapted to process a frequency division multiplex (FDM) communication signal and output a baseband signal defining a demodulated OFDM system;
at least one analog to digital converter (ADC) operatively coupled to said demodulated OFDM system; and
a first frequency modulation (FM) demodulator, said first FM demodulator receiving an analog frequency modulated (FM)-FDM communication signal from said transmission medium coupled thereto and outputting a frequency demodulated analog FDM signal to said ADC;
said demodulated OFDM system being operatively coupled to an output of said first FM demodulator, said first FM demodulator being adapted to receive an FM-FDM signal from the transmission medium and output said frequency demodulated analog FDM signal, wherein said FM-FDM signal undergoes FM modulation, wherein said demodulated OFDM system digitally demodulates said FDM signal with a digital modulation technique adaptively selected based on a retrieved transmission medium quality feedback.

8. The apparatus of claim 7, wherein an output of the transmission medium includes an in-phase signal and a quadrature signal, the in-phase signal being provided to the first FM demodulator and the quadrature signal being provided to a second FM demodulator, the first and the second FM demodulators each outputting a frequency demodulated FDM signal to the demodulated OFDM system.

9. An apparatus for transmitting a communication signal over a transmission medium, said apparatus comprising:
a plurality of digital signal processing units adapted to process an incoming baseband signal and output a frequency division multiplex (FDM) output signal defining a modulated OFDM system, wherein the baseband signal is digitally modulated with a digital modulation technique adaptively selected based on a retrieved transmission medium quality feedback;
at least one digital to analog converter (DAC) operable to convert said FDM output signal to at least one analog FDM signal; and
a first frequency modulation (FM) modulator disposed in serial relation to said modulated OFDM system and coupled to said at least one DAC, said first FM modulator receiving said analog FDM signal of said DAC and outputting a frequency modulated (FM)-FDM signal to the transmission medium, wherein said frequency division multiplex (FDM) signal is a phase shift keying or an amplitude modulated signal, said frequency modulated FM-FDM signal undergoing FM modulation.

10. The apparatus of claim 9, further including a second FM modulator wherein the analog FDM output signal of the modulated OFDM system includes an in-phase signal and a quadrature signal, the in-phase signal being provided to the first FM modulator and the quadrature signal being provided to the second FM modulator, the first and the second FM modulators each outputting a frequency modulated FM-FDM output signal to the transmission medium.

11. An apparatus for receiving a communication signal from a transmission medium, said apparatus comprising:
a plurality of digital signal processing units being adapted to process a frequency division multiplex (FDM) communication signal and output a baseband signal defining a demodulated OFDM system;
at least one analog to digital converter (ADC) operatively coupled to said demodulated OFDM system; and
a first frequency modulation (FM) demodulator disposed in serial relation with said demodulated OFDM system, said first FM demodulator receiving an analog frequency modulated (FM)-FDM communication signal from said transmission medium coupled thereto and outputting an analog FDM communication signal to said ADC, said analog FDM signal demodulated by said FM demodulator;
said demodulated OFDM system being operatively coupled to an output of the first FM demodulator wherein said frequency division multiplex (FDM) communication signal is phase shift keying or an amplitude modulated signal, said demodulated OFDM system digitally demodulates said FDM signal with a digital modulation technique adaptively selected based on a retrieved transmission medium quality feedback.

12. The apparatus of claim 11, wherein an output of the transmission medium includes an in-phase signal and a quadrature signal, the in-phase signal being provided to the first FM demodulator and the quadrature signal being provided to a second FM demodulator, the first and the second FM demodulators each outputting a frequency demodulated FDM signal to the first frequency demodulators.

13. The apparatus as recited in claim 1, wherein said FDM signal is an Orthogonal Frequency Division Multiplex signal.

14. The apparatus as recited in claim 3, wherein said FDM signal is an Orthogonal Frequency Division Multiplex signal.

15. The apparatus as recited in claim 5, wherein said FDM signal is an Orthogonal Frequency Division Multiplex signal.

16. The apparatus as recited in claim 7, wherein said FDM signal is an Orthogonal Frequency Division Multiplex signal.

17. The apparatus as recited in claim 9, wherein said FDM signal is an Orthogonal Frequency Division Multiplex signal.

18. The apparatus as recited in claim 11, wherein said FDM signal is an Orthogonal Frequency Division Multiplex signal.

19. An apparatus for transmitting a communication signal over a transmission medium, said apparatus comprising:
digital signal processing units adapted to processing an incoming baseband signal, wherein the baseband signal is digitally modulated with a digital modulation technique selected based on a retrieved transmission medium quality feedback, and outputting either a frequency division multiplexed (FDM) output signal or an orthogonal frequency division multiplex (OFDM) output signal; and further comprising
a first frequency modulation modulator, said first frequency modulation modulator receiving the FDM output signal or the orthogonal frequency division multiplex (OFDM) output signal as the output signal of said digital signal processing units and outputting a frequency modulated signal to the transmission medium.

20. The apparatus od claim 19, further including a second frequency modulation modulator wherein the output signal of the digital signal processing units consists of an in-phase signal and a quadrature signal, the in-phase signal being provided to the first frequency modulation modulator and the quadrature signal being provided to the second frequency modulation modulator, the first and second frequency modulation modulators each outputting a frequency modulated output signal to the transmission medium.

21. An apparatus for receiving a communication signal from a transmission medium, said apparatus comprising:
digital signal processing units adapted to processing either an orthogonal frequency division multiplex (OFDM) communication signal or a frequency division multiplex (FDM) communication signal, wherein the communication signal is digitally demodulated with a digital modulation technique selected based on a retrieved transmission medium quality feedback, and outputting a baseband signal; and further comprising
a first frequency demodulator, said digital signal processing units being operatively connected to an output of the first frequency demodulator, said first frequency demodulator being adapted to receive an output from the transmission medium and outputting a frequency demodulated frequency division multiplex (FDM) signal or an orthogonal frequency division multiplex (OFDM) signal.

22. The apparatus as recited in claim 21, wherein the output of the transmission medium consists of an in-phase signal and a quadrature signal, the in-phase signal being provided to the first frequency demodulator and the quadrature signal being provided to a second frequency demodulator, the first and the second frequency demodulators each outputting a frequency demodulated signal to the digital signal processing units.

23. An apparatus comprising:
an Orthogonal Frequency Division Multiplexing (OFDM) Modulator that retrieves forward channel quality feedback from a receiver and selects a code to encode a bit stream, interleaves encoded bits to break error bursts into scattered individual errors across a transmission, the transmission comprising information from the bit stream, modulates the transmission, inserts pilot symbols, modulates specific carriers via Inverse Fast Fourier Transform, and outputs the transmission;
a first frequency modulator, the OFDM Modulator operatively connected the first frequency modulator, the first frequency modulator constructed to frequency modulate the transmission that is outputted from the OFDM Modulator.

24. The apparatus of claim 23, further comprising:
a second frequency modulator, the OFDM Modulator operatively connected the second frequency modulator, wherein the first frequency modulator and the second frequency modulator each creating a separate frequency band for in-phase components of the transmission and quadrature components of the transmission.

* * * * *